United States Patent
Zhang

(10) Patent No.: US 11,374,667 B2
(45) Date of Patent: Jun. 28, 2022

(54) LOCALIZING COMMUNICATIONS INTERFERENCE NODE

(71) Applicant: Ford Global Technologies, LLC, Dearborn, MI (US)

(72) Inventor: Linjun Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 16/680,918

(22) Filed: Nov. 12, 2019

(65) Prior Publication Data

US 2021/0143924 A1  May 13, 2021

(51) Int. Cl.
| | |
|---|---|
| *H04B 17/345* | (2015.01) |
| *H04W 64/00* | (2009.01) |
| *H04B 17/27* | (2015.01) |
| *H04W 4/02* | (2018.01) |
| *H04W 4/44* | (2018.01) |

(52) U.S. Cl.
CPC .......... *H04B 17/345* (2015.01); *H04B 17/27* (2015.01); *H04W 4/027* (2013.01); *H04W 4/44* (2018.02); *H04W 64/003* (2013.01); *H04W 64/006* (2013.01)

(58) Field of Classification Search
CPC ...... H04B 17/345; H04W 4/44; H04W 4/027; H04W 4/003; H04W 64/006
See application file for complete search history.

(56) References Cited

U.S. PATENT DOCUMENTS

| | | | |
|---|---|---|---|
| 8,314,718 B2 | 11/2012 | Muthaiah et al. | |
| 9,439,205 B1* | 9/2016 | Lin | ............... H04L 1/00 |
| 10,262,475 B2 | 4/2019 | Smith | |
| 2006/0183487 A1* | 8/2006 | Allen | ............. H04W 24/02 455/456.5 |
| 2016/0031459 A1* | 2/2016 | Murren | ............. B61L 15/0027 701/22 |
| 2019/0215695 A1* | 7/2019 | Yang | ............... H04L 9/3271 |

FOREIGN PATENT DOCUMENTS

DE   102013207587 B4   12/2015

* cited by examiner

*Primary Examiner* — Ankur Jain
*Assistant Examiner* — Angelica M Perez
(74) *Attorney, Agent, or Firm* — Frank A. MacKenzie; Bejin Bieneman PLC

(57) ABSTRACT

A system comprises a computer including a processor. The processor receives from each of a plurality of vehicles within a region, a respective plurality of messages and identifies for each of the plurality of vehicles, a respective communications discontinuity during which an expected message fails to be received from the respective vehicle. The processor determines, for each communications discontinuity, discontinuity edge locations at each of a beginning of the communications discontinuity and an end of the communications discontinuity. The processor further determines an interference node location based on the discontinuity edge locations.

20 Claims, 6 Drawing Sheets

LOCALIZING COMMUNICATIONS INTERFERENCE NODE

BACKGROUND

Vehicle to everything (V2X) communications may be used to improve efficiency of vehicle travel. An interfering radio frequency transmitter may disrupt vehicle communications within an area by, for example, broadcasting high volumes of data over a communications channel and thereby impairing or preventing use of the communications channel by vehicles in the area. An infrastructure device in the area programmed to communicate with vehicles in the area may not be able to detect the presence of an interference source. For example, a signal strength of an interference source may be too low for detection by the infrastructure device. If unable to detect the presence of the interference node, the infrastructure device is also unable to localize the interference node and initiate counter measures.

DETAILED DESCRIPTION

Introduction

Figure 1:
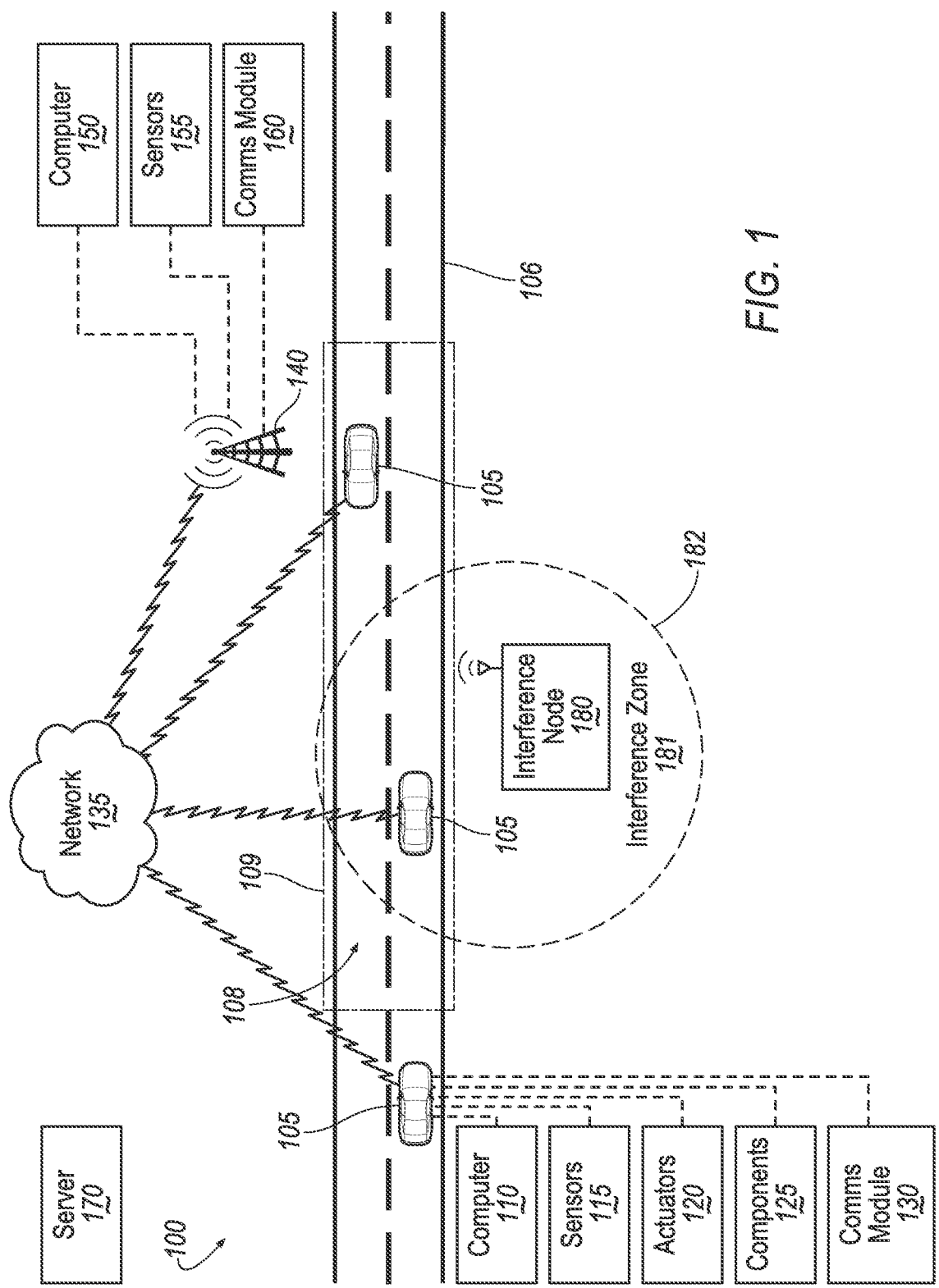
FIG. 1 is a diagram of an example system for estimating a location of an interference node based on discontinuities in vehicle to infrastructure communications.

Disclosed is a system comprising a computer including a processor and a memory, the memory including instructions such that the processor is programmed to receive from each of a plurality of vehicles within a region, a respective plurality of messages; identify for each of the plurality of vehicles, a respective communications discontinuity during which an expected message fails to be received from the respective vehicle; determine, for each communications discontinuity, discontinuity edge locations at each of a beginning of the communications discontinuity and an end of the communications discontinuity; and determine an interference node location based on the discontinuity edge locations.

In the system, the plurality of messages from each of the plurality of vehicles can be received by an infrastructure device.

In the system, the plurality of vehicles within the region can be within range for vehicle-to-infrastructure communications with the infrastructure device.

In the system, identifying each communications discontinuity can be based on an amount of time between two consecutively received messages from the respective vehicle greater than a threshold amount of time.

In the system, identifying each communications discontinuity can be based on a travel distance between two consecutively received messages from the respective vehicle greater than a threshold distance.

In the system, the threshold distance between the two consecutively received messages can be based on data from one of the messages received from the respective vehicle specifying a velocity of the vehicle.

In the system, determining the discontinuity edge location at the beginning of each communications discontinuity can be based on a location of the respective vehicle at a time of transmitting a last message received prior to the communications discontinuity.

In the system, determining the discontinuity edge location at the end of each communications discontinuity can be based on a location of the respective vehicle at a time of transmitting the first message received after the communications discontinuity.

In the system, the processor can further be programmed to output the interference node location to at least one second computing device.

In the system, the processor can further be programmed to: identify, from the discontinuity edge locations, outlier discontinuity edge locations based on a number of other discontinuity edge locations within a predetermined distance less than a threshold number of other discontinuity edge locations; and remove the outlier discontinuity edge locations from the discontinuity edge locations.

In the system, the processor can further be programmed to: select a plurality of subsets of discontinuity edge locations from the discontinuity edge locations, each of the plurality of subsets including three randomly selected discontinuity edge locations; and identify, for each of the subsets of discontinuity edge locations, a respective location of a center of a circle whose circumference passes through the respective three randomly selected discontinuity edge locations; wherein estimating the interference node location is based on the locations of the centers of the circles.

In the system, the processor can further be programmed to: upon receiving a first message of the respective plurality of messages for each of the vehicles in the region, open a log to record messages from the respective vehicle.

Further disclosed is a method comprising: receiving from each of a plurality of vehicles within a region, a respective plurality of messages; identifying for each of the plurality of vehicles, a respective communications discontinuity during which an expected message fails to be received from the respective vehicle; determining, for each communications discontinuity, discontinuity edge locations at each of a beginning of the communications discontinuity and an end of the communications discontinuity; and determining an interference node location based on the discontinuity edge locations.

In the method, the plurality of messages from each of the plurality of vehicles can be received by an infrastructure device; and the plurality of vehicles within the region can be within range for vehicle-to-infrastructure communications with the infrastructure device.

In the method, identifying each communications discontinuity can be based on at least one of (1) an amount of time between two consecutively received messages from the respective vehicle greater than a threshold amount of time and (2) a travel distance between two consecutively received messages from the respective vehicle greater than a threshold distance.

In the method, determining the discontinuity edge location at the beginning of each communications discontinuity can be based on a location of the respective vehicle at a time of transmitting a last message received prior to the communications discontinuity and determining the discontinuity edge location at the end of each communications discontinuity can be based on a location of the respective vehicle at a time of transmitting the first message received after the communications discontinuity.

The method can further comprise: outputting the interference node location to at least one second computing device.

The method can further comprise: identifying, from the discontinuity edge locations, outlier discontinuity edge locations based on a number of other discontinuity edge locations within a predetermined distance less than a threshold number of other discontinuity edge locations; and removing the outlier discontinuity edge locations from the discontinuity edge locations.

The method can further comprise: selecting a plurality of subsets of discontinuity edge locations from the discontinuity edge locations, each of the plurality of subsets including three randomly selected discontinuity edge locations; and identifying, for each of the subsets of discontinuity edge locations, a respective location of a center of a circle whose circumference passes through the respective three randomly selected discontinuity edge locations; wherein estimating the interference node location is based on the locations of the centers of the circles.

The method can further comprise: upon receiving a first message of the respective plurality of messages for each of the vehicles in the region, opening a log to record messages from the respective vehicle.

Further disclosed herein is a computing device programmed to execute any of the above method steps.

Yet further disclosed herein is a computer program product, including a computer readable medium storing instructions executable by a computer processor, to execute an of the above method steps.

Exemplary System Elements

A location of an interference node can be estimated based on communications discontinuities for vehicles in communications with an infrastructure device while the vehicles are travelling through a region of interest (ROI) during a data collection period. An interference node in this context is a stationary radio frequency transmitter such as a Wi-Fi hotspot or a vehicle transmitter (e.g., DSRC, cellular) that is transmitting data on a communications channel used for vehicle-to-vehicle (V2V) and/or vehicle-to-infrastructure (V2I) communications such that vehicle communications are disrupted within an interference zone. The term "stationary," as used in reference to the interference node, means that the interference node remains at a same geo-location during the data collection period. For example, the interference node may transmit large amounts of data and thereby reduce the available capacity of the communications channel to a level that vehicle messages are partially or completely blocked. A corresponding channel busy ratio (CBR) for the communications channel indicating a ratio of occupied channel capacity to total channel capacity, will be high.

The interference zone in this context is defined by an area on the earth's surface (i.e., the interference zone is a volume) in which the transmissions from the interference node interfere with vehicle-to-vehicle (V2V) and vehicle-to-infrastructure (V2I) communications. A communications discontinuity in the present context means that no message is received from a vehicle by the infrastructure device when a message was expected to be received. As described in detail below, the communications discontinuity can be determined based on an amount of time greater than a threshold amount of time between two consecutively received messages by the infrastructure device from a same vehicle and/or a distance travelled by a vehicle between two consecutively received messages greater than a threshold distance. A region of interest (ROI) in this context is an area on or above the earth's surface (i.e., a volume) selected, for example, by operator input, pre-programming, or by a computer based on data indicating a possible presence of an interference node, as an area within which vehicle-to-infrastructure communications are to be monitored by the infrastructure device. It follows that the region of interest (ROI) must be selected such that vehicles within the region of interest (ROI) are within range for vehicle-to-infrastructure (V2I) communications with the infrastructure device. A data collection period in this context is an amount of time during which the system collects a set of data related to communications discontinuities for the plurality of vehicles travelling through the region of interest (ROI).

A communications discontinuity includes two discontinuity edges: a first discontinuity edge where the communication drops off and a second discontinuity edge where the communications resume. A discontinuity edge is a transition between receiving communications from a vehicle and not receiving communications from the vehicle as the vehicle travels through the region of interest (ROI): Each discontinuity edge can be described by a discontinuity edge location and a discontinuity edge time. The discontinuity edge location is a location of a vehicle at a time of the discontinuity edge. The discontinuity edge time is the time of the discontinuity edge.

In practice, the system may consider the last communication with the vehicle before the communications discontinuity as the first discontinuity edge and the first communication following the communications discontinuity as the second discontinuity edge. First and second discontinuity edges are referred to herein collectively as discontinuity edges. The system identifies discontinuity edges and determines, based on a timing of the associated communications, discontinuity edge times for the discontinuity edge locations. The system further identifies, based on sensor data and vehicle operating state data, locations of the discontinuity edges. Based on the discontinuity edge locations, the system further estimates an interference node location. The system can further report the estimated location of the interference node to other computing devices and/or service personnel, for example, via a human-machine interface (HMI) to take appropriate actions to restore vehicle communications in the interference zone.

As described in additional detail below, in a typical scenario, each vehicle, based on applicable standards, may be programmed to periodically transmit messages. A typical transmission rate may be once every 100 milliseconds. Accordingly, the infrastructure device may receive 10 messages from each vehicle each second. In a case that, for example, 50 vehicles are within range to communicate with the infrastructure device, the infrastructure device may receive 500 messages per second. In order to track each vehicle as it passes through the region of interest, and identify communications discontinuities, the infrastructure device requires the capability to receive messages via radio frequency transmissions from a plurality of vehicles, associate a time of receipt of each message, analyze the message to determine the origin (transmitting vehicle) of each message, and store the messages in a relational data base such that each message can be associated with a time of receipt and the transmitting vehicle.

Based on identifying communications discontinuities as disclosed herein, the infrastructure device can initially determine that an interference node is present, thereby addressing the issue discussed above that infrastructure devices may lack the ability to make such detection at present. Further advantageously, based on determining the presence of the interference node, the infrastructure device may broadcast messages to vehicles entering the region of interest that vehicle-to-vehicle and vehicle-to-infrastructure communications in the region of interest may be disrupted. In some examples, the infrastructure device may instruct vehicles to switch to a different communication channel for vehicle-to-vehicle and vehicle-to-infrastructure communications. In some cases, for example when all available communications channels are congested, the infrastructure device may recommend and/or the vehicles may determine, based on the message from the infrastructure device, to take cautious maneuvers such as slowing down.

Further, based on the stored message data, the infrastructure device may determine and report a location of the interference node. Determining the location of the interference node as disclosed herein thus further addresses technical shortcomings with infrastructures discussed above, e.g., may facilitate rapid remediation of the interference condition and rapid restoration of vehicle-to-vehicle and vehicle to infrastructure communications within the interference zone.

The infrastructure may further advantageously report the location of the interference node to vehicles before they enter the region of interest. In some cases, this may permit vehicles to change their routes to avoid the interference zone and thereby maintain (avoid interference with) vehicle-to-vehicle and vehicle-to-infrastructure communications.

Still further, in some cases, sensors on or associated with the infrastructure device, for example cameras, may be directed to the location of the interference node and images of the interference node collected. In this manner, interference nodes, for example interference nodes mounted on vehicles, may be identified before being moved to a new location.

Still further, in some cases, the infrastructure device may determine that communications with vehicles are being dropped, i.e., that the infrastructure device does not receive expected communications from one or more vehicles, but be unable to identify a second edge of the communications discontinuities with the vehicles, when (and where) communications are restored. In these cases, the infrastructure device may, for example, based on determining a direction of travel of vehicles with which communications are lost, adjust a location of the region of interest to locate the second edge of the communications discontinuities for future vehicles.

FIG. 1 is a block diagram of an example infrastructure communications system 100 for estimating a location of an interference node 180 based on communications discontinuities between vehicles 105 and an infrastructure device 140. In an example, the vehicles 105 are travelling on a road 106. The interference node 180 transmits data in a vehicle communications channel that disrupts vehicle-to-vehicle (V2V) and vehicle-to-infrastructure (V2I) communications within an interference zone 181. The interference zone has an interference zone periphery 182. In the example, the transmission power of the interference node 180 is set such that the transmissions from the interference node 180 are not directly detectable by the infrastructure device 140 (i.e., that the interference zone 181 does not extend to location of the infrastructure device 140).

The system 100 includes one or more vehicles 105, a network 135, an infrastructure device 140, and a server 170. As described further below, the system 100 identifies discontinuities of vehicle-to-infrastructure (V2I) communications between vehicles 105 and an infrastructure device 140 in a region of interest (ROI) 108.

The region of interest (ROI) 108 has a region of interest periphery 109. The region of interest (ROI) 108 may be, for example, defined with geo-coordinates as a region to be monitored by the infrastructure device 140. For example, the region of interest (ROI) 108 may be a section of the road 106. The region of interest (ROI) 108 may be designated by user input, determined based on a location of the infrastructure 140, and/or programmed by a remote computer such as the server 170.

In some cases, the region of interest (ROI) 108 may be selected based on indications that an interference node 180 is present in an area. For example, the infrastructure device 140, in the course of normal communications with vehicle 105, may detect that an unusual number of communications discontinuities are occurring in the area. In another example, a vehicle 105 may detect that vehicle-to-vehicle (V2V) communications within the area are not working and report the failure to the infrastructure device 140 (or another infrastructure device 140 upon reestablishing communications). As another example, a vehicle equipped for detecting interference nodes 180 may detect data transmissions that appear to be fraudulent while travelling through the area and report the area to the infrastructure device 140 and/or to the server 170. In such cases, the infrastructure device 140 may define and determine to monitor a region of interest (ROI) 108 or a remote computer, such as the server 170, or another infrastructure device 140, may send instructions to the infrastructure device 140 defining the region of interest (ROI) 108 to be monitored by the infrastructure device 140.

The system 100 further identifies discontinuity edge locations at a beginning and end of the communications discontinuities. Based on discontinuity edge locations, the system 100 estimates a location of the interference node 180.

Each vehicle 105 is a vehicle such as a car, truck, motorcycle, boat, airplane, etc., and can include a vehicle computer 110, sensors 115, actuators 120 to actuate various vehicle components 125, and a vehicle communications module 130. In an example, the vehicle 105 is a land vehicle. Three vehicles 105 are shown in FIG. 1 for ease of illustration, but the system 100 can include one or more of vehicles 105.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network, more than one processor, e.g., included in electronic control units (ECUs) or the like included in the vehicle 105 for monitoring and/or controlling various vehicle components 125, e.g., a powertrain controller, a brake controller, a steering controller, etc. As used herein, the vehicle communications network is defined as one or more mechanisms for wired or wireless communications between the computers 110, sensors 115, actuators 120, components 125, communications module 130, etc. of the vehicle 105. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), Wi-Fi Direct, Dedicated Short-Range Communication (DSRC), and 5G/LTE Cellular Communication.

Via the vehicle communications network, the vehicle computer 110 may transmit and/or receive messages from the various devices, e.g., sensors 115, actuators 120, vehicle components 125, etc. Additionally, in cases where the vehicle computer 110 comprises a plurality of devices, the vehicle communications network may be used for communications between devices represented as the vehicle computer 110 in this disclosure.

In an example, the vehicle computer 110 is programmed to periodically transmit messages to the infrastructure device 140 and other vehicles 105. Periodically, as used herein means at regularly occurring intervals, for example, once every 100 milliseconds (ms). The messages include data such as vehicle location (latitude, longitude), velocity, acceleration and heading. The messages may further include vehicle size (width, height, length), model and/or type, and/or brake component status. The messages may be or include basic safety messages (BSMs) as defined for vehicle-to-vehicle and vehicle-to-infrastructure communications according to the standard defined in Society of Automotive Engineers (SAE) J2735 BSM.

Vehicle sensors 115 may include a variety of devices such as are known to provide data to the vehicle computer 110. For example, the sensors 115 may include light detection and ranging (lidar) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further, e.g., include camera sensor(s) 115, e.g. front view, side view, etc., providing images from an area surrounding the vehicle 105.

The sensors 115 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine speed, brake pressure, etc.

The actuators 120 are implemented via circuits, chips, or other electronic and or mechanical components that can actuate various vehicle components 125 in accordance with appropriate control signals as is known. The actuators 120 may be used to control vehicle components 125, including braking, acceleration, and steering of a vehicle 105.

A vehicle component 125 in the context of this disclosure is one or more hardware components, including an electronic control unit (ECU) including one or more processors and memory including instructions for programming the processors, adapted to perform a mechanical or electromechanical function or operation—such as moving the vehicle 105, slowing or stopping the vehicle 105, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a suspension, an electronic stability control (ESC) module, a wiper control module, etc.

The vehicle computer 110 is additionally configured for communicating via a vehicle communications module 130 with devices outside of the vehicle 105 via a network 135. As non-limiting examples, communications with outside devices includes vehicle-to-vehicle (V2V), vehicle-to-infrastructure (V2I) wireless communications to other vehicles and to infrastructure devices 140 (typically via direct radio frequency communications), and communications with the server 170 and other computing devices.

The vehicle communications module 130 can include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module 130 include cellular, Bluetooth, IEEE 802.11, dedicated short-range communications (DSRC) for vehicle-to-vehicle (V2V) and vehicle-to-infrastructure (V2I) communications, cellular V2V, 5G/LTE and/or wide area networks (WAN), including the Internet, providing data communication services.

The network 135 represents one or more mechanisms by which each of the vehicles 105, the infrastructure devices 140 and the server 170 can communicate with each other. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) and vehicle-to-infrastructure (V2I) communications such as Dedicated Short-Range Communications (DSRC), 5G/LTE, etc.), local area networks (LAN) and/or wide area networks (WAN), including the Internet, providing data communication services.

An infrastructure device 140 includes a physical structure such as a tower or other support structure (e.g., a pole, a box mountable to a bridge support, cell phone tower, road sign support, etc.) on which infrastructure sensors 155, as well as an infrastructure communications module 160 and an infrastructure computer 150 can be mounted, stored, and/or contained, and powered, etc. The infrastructure device 140 is typically stationary, i.e., fixed to and not able to move from a specific geographic location. Although not shown for ease of illustration, the infrastructure device 140 also includes a power source such as a battery, solar power cells, and/or a connection to a power grid.

The infrastructure computer 150 includes a processor and a memory such as are known. The memory includes one or more forms of computer-readable media, and stores instructions executable by the infrastructure computer 150 for performing various operations, including operations to estimate a location of an interference node 180 based on detected communications discontinuities between vehicles 105 and the infrastructure device 140.

As described additionally below, the infrastructure computer 150 is programmed to receive, via vehicle-to-infrastructure communications, messages from vehicles 105 and detect communications discontinuities as the vehicles 105 pass through a region of interest (ROI) 108. The programming includes collecting, via infrastructure sensors 155, sensor data related to the vehicles 105. Based on the sensor data, the infrastructure computer 150 may determine operating states of the vehicle 105. An operating state in the context of this disclosure means a datum or data that specifies a physical condition or measurement of operation of the vehicle 105 at a time. Non-limiting examples of operating states include a location of the vehicle 105, a velocity (speed and heading) of the vehicle 105, and an acceleration of the vehicle 105.

The infrastructure sensors 155 may include one or more sensors such as, e.g., lidar, radar, cameras, ultrasonic sensors, etc. for detecting a presence of objects such as vehicles 105 in or approaching the region of interest (ROI) 108.

The infrastructure sensors 155 may be fixed or stationary. That is, each infrastructure sensor 155 may be mounted to the infrastructure device 140 to have a substantially unmoving and unchanging field of view or communications range. Alternatively or additionally, an infrastructure sensor 155 could be mounted to rotate or otherwise move a field of view, e.g., on a movable arm, rotatable platform, or the like.

The communications module 160 typically has features in common with the vehicle communications module 130, and therefore will not be described further to avoid redundancy.

The server 170 can be a conventional computing device, i.e., including one or more processors and one or more memories, programmed to provide operations such as disclosed herein. Further, the server 170 can be accessed via the network 135, e.g., the Internet or some other wide area network. The server 170 can provide data, such as map data, weather data, calendar data, time-of-day data, traffic data, etc. to the infrastructure computer 150 or the vehicle computer 110.

The server 170 can further be programmed to receive data (reports) from the infrastructure device 140 indicating an estimated location of an interference node 180, transmit the data to other computing devices, and/or communicate the data to a user, service personnel, etc. via a human-machine interface (HMI).

The interference node 180 is a radio frequency transmitter such as a transmitter associated with a Wi-Fi hotspot or a transmitter in a vehicle for communications with other vehicles. The interference node 180 is programmed to transmit data, which may include fake or fraudulent messages in a communications channel used for vehicle-to-vehicle (V2V) and/or vehicle-to-infrastructure (V2I) communications. As a non-limiting example, the interference node 180 may transmit data in a frequency range of 5.85 to 5.925 MHz designated for DSRC communications. The interference node 180 may be programmed, for example, to send a high volume of data such that the communications channel is overloaded and has limited or no capacity for vehicles 105 to communicate with other vehicles 105 or the infrastructure device 140. Further, a signal strength of the interference node 180 may be programmed (or otherwise set) such that the interference node transmissions interfere with communications within an interference zone 181 but are not detectable by an infrastructure device 140 outside of the interference zone 181. In this manner, the interference node 180 may avoid direct detection by the infrastructure device 140. Direct detection in the context of this disclosure means detection based on receipt of transmissions directly from the interference node 180 without any repeater or other intermediary relaying of the transmissions.

Figure 2:
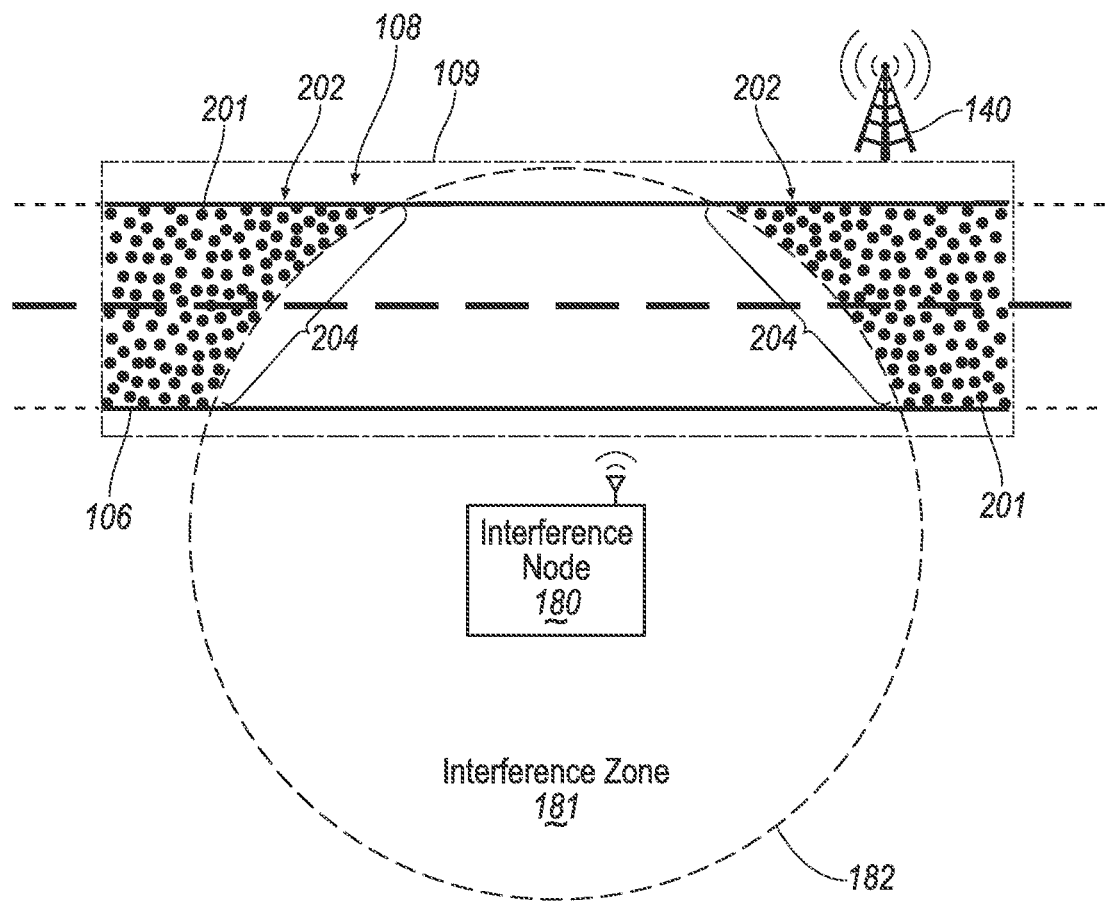
FIG. 2 is a diagram of an example interference zone surrounding an interference node.

FIG. 2 is a diagram of an example interference zone 181 surrounding an interference node 180. The interference zone has a periphery 182. Transition lines 204 are sections of the periphery 182 indicating where vehicles 105 will move into and out of (depending on a direction of travel) the interference zone 182 when travelling along the road 106. As vehicles 105 travel along the road 106, they broadcast messages to the infrastructure device 140 and other vehicles 105. The vehicles 105 may transmit the messages periodically, for example every 100 milliseconds. Message transmission locations 201 on the road 106 identify locations from which the infrastructure device 140 received messages from vehicles 105. Before entering and after leaving the interference zone 181, in areas 202, the messages can be received by the infrastructure device 140. Messages transmitted from vehicles 105 while within the interference zone 181, are disrupted by transmissions from the interference node 180, such that they cannot be received by the infrastructure device 140.

Figure 3:
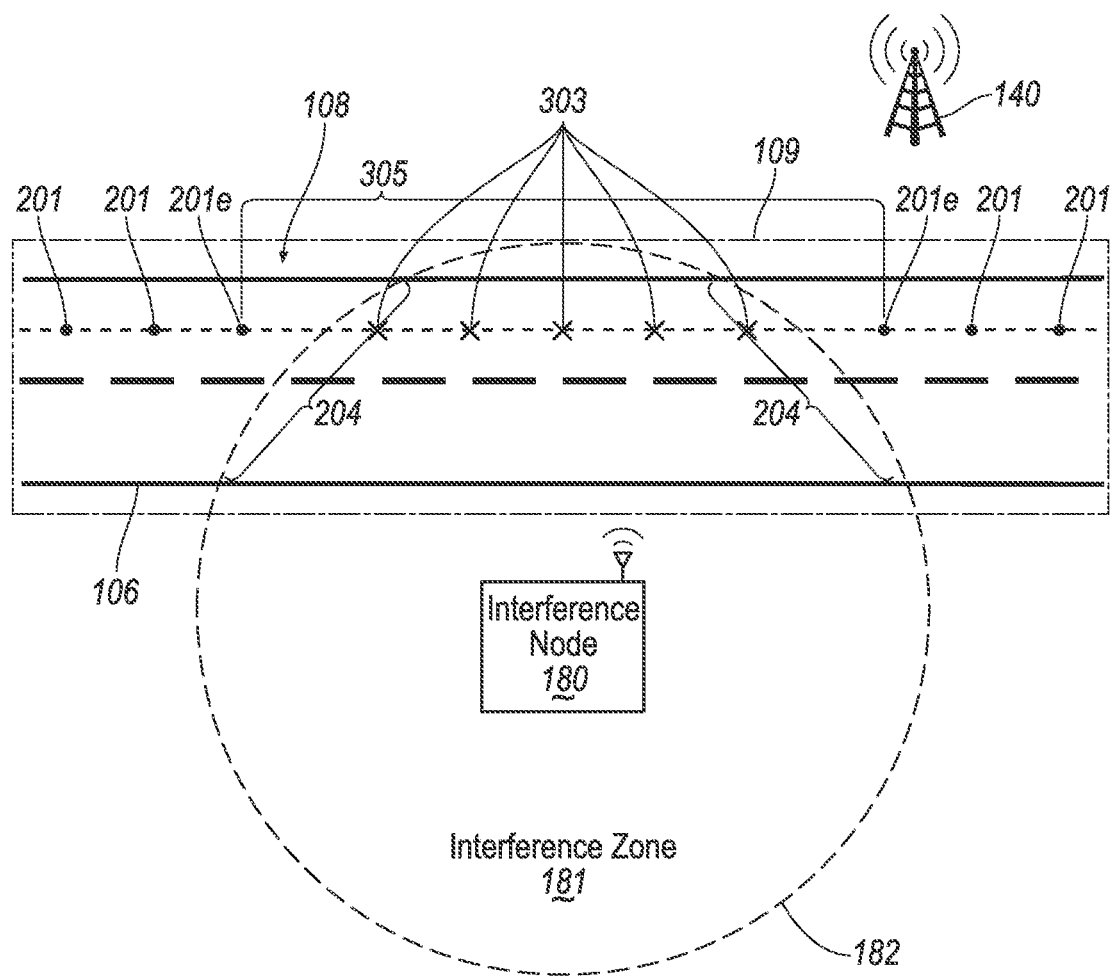
FIG. 3 is a diagram illustrating an example of a communications discontinuity for a vehicle travelling through an interference zone.

FIG. 3 is a diagram illustrating an example of a communications discontinuity 305 for a single vehicle 105 travelling through the interference zone 181. The message transmission locations 201, 201e identify locations from which the infrastructure device 140 received messages from the single vehicle 105. The locations 303 are locations from which the vehicle 105 transmitted messages, but the infrastructure device 140 was unable to receive the messages.

The communications discontinuity 305 is a time during which a message is expected to be received from a vehicle 105 by the infrastructure device 140 and no message is received. The communications discontinuity may be determined to be an amount of time greater than a threshold amount of time between two consecutively received messages by the infrastructure device 140 from the single vehicle 105 or a distance travelled by a vehicle 105 greater than a threshold distance between two consecutively received messages. The communications discontinuity includes two discontinuity edges; a first discontinuity edge at a first location 201e where the communication drops off prior to entering the interference zone 181 and a second discontinuity edge at a second location 201e where the communications resume after leaving the interference zone

181. A location of the communications discontinuity 305 is a path along the road 106 between the first discontinuity edge location 201*e* and the second discontinuity edge location 201*e*.

Figure 4:
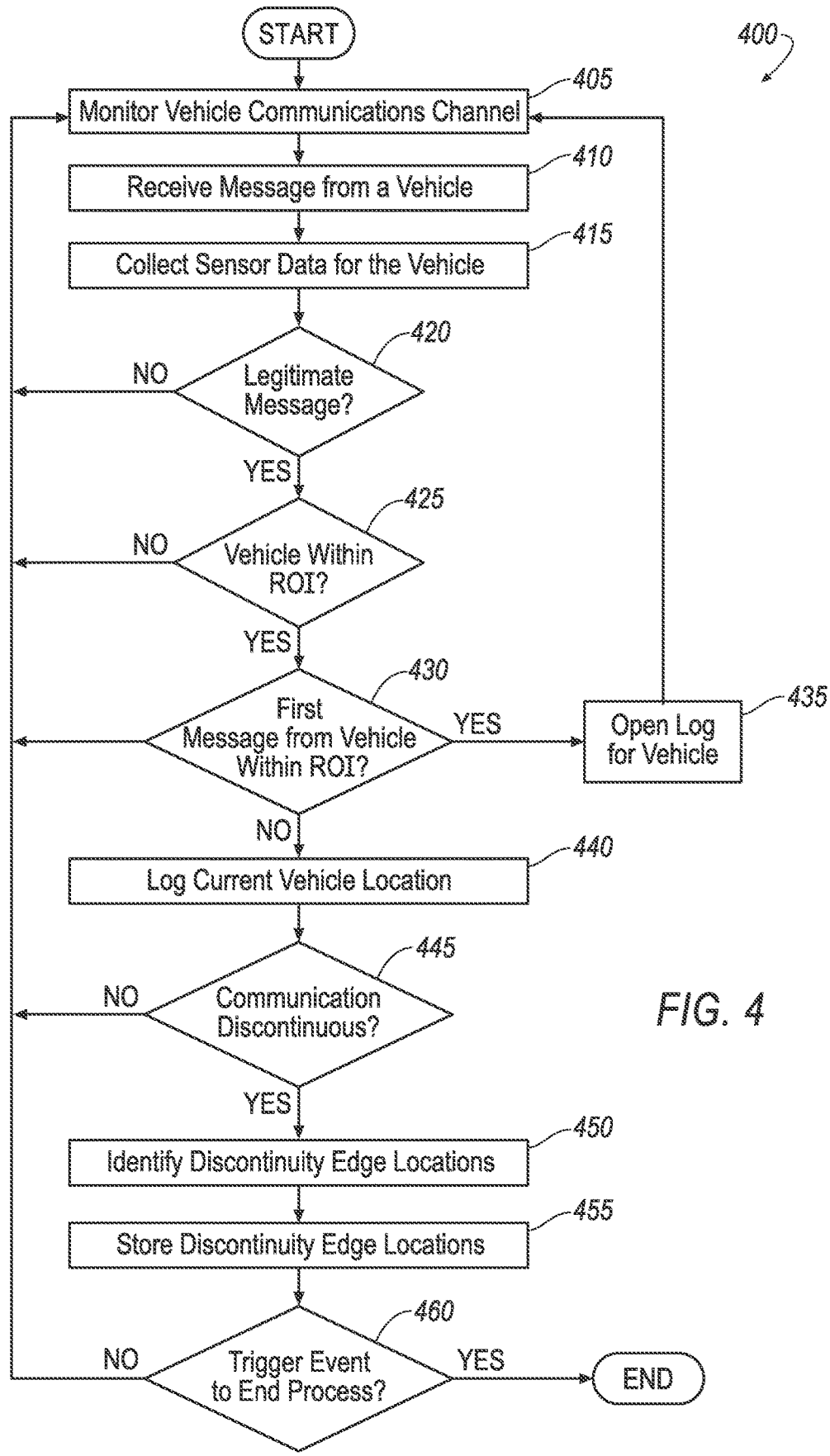
FIG. 4 is a flow diagram of an example process for identifying discontinuity edge locations for a vehicle entering and leaving an interference zone.

FIG. 4 is a flow diagram of an example process 400 for identifying discontinuity edge locations 201*e* for a vehicle 105 entering and leaving an interference zone 181. The computer 150 of the infrastructure device 140 detects the vehicle 105 as it enters a region of interest (ROI) 108. Based on communications from the vehicle 105 and sensor data from infrastructure sensors 115, the computer 150 identifies communications discontinuities 305 between the vehicle 105 and the computer 150 and identifies locations of discontinuity edges 201*e* at a beginning and end of the communications discontinuity 305. The computer 150 may determine the location of the discontinuity edge location 201*e* at the beginning of the communications discontinuity 305 based on the location of the vehicle 105 at the time of transmitting the last received message prior to the communications discontinuity 305. The computer 150 may further determine the location of the discontinuity edge location 201*e* at the end of the communications discontinuity 305 based on the location of the vehicle 105 at the time of transmitting the first received message after the communications discontinuity 305. The computer 150 stores the discontinuity edge locations 201*e* for further processing. The process 400 begins in a block 405.

In the block 405, the computer 150 receives a message from a vehicle 105. The message includes data related to an operating state of the vehicle 105 including vehicle location (latitude, longitude), velocity (speed and heading), and acceleration. The message may further include data such as vehicle size (width, height, length), vehicle model and/or vehicle type. The process 400 continues in a block 410.

In the block 410, the computer 150 collects sensor data for the vehicle 105. The computer 150 receives data from sensors 115 and/or communicatively coupled to the infrastructure device 140. In some cases, the computer 150 may activate the sensors 115, and/or direct the sensors 115 toward the location of the vehicle 105 prior to collecting the sensor data. The process 400 then continues in a block 420.

In the block 420, which could be omitted, the computer 150 may determine whether the message is legitimate, based on a comparison of data in the message, and data collected from the sensors 115. For example, the computer 150 may determine, based on sensor data, whether a vehicle 105 is present at or within a threshold variance of the location indicated in the message. The computer 150 may further determine, based on sensor data, whether the vehicle 105 is travelling at or within a threshold variance of the speed indicated in the message, and is travelling at or within a threshold variance of the heading indicated in the message. Other data may also be compared, such as vehicle size, vehicle model type, etc.

Based on one or more of these criteria, the computer 150 may determine whether the message is a legitimate message or a fake message. The threshold variance for each operating parameter may be determined based on known tolerances in the message data and the sensor data.

In a case that the computer 150 determines that the message was legitimate, the process 400 continues in a block 425. Otherwise, the process continues in the block 405.

In the block 425, the computer 150 determines whether the vehicle 105 is within a region of interest (ROI) 108. As noted above, the region of interest (ROI) 108 may be, for example, an area defined with geo-coordinates to be monitored by the computer 150, such as a section of the road 106. The computer 150, based on the geo-location of the vehicle 105, as indicated in the message received from the vehicle 105, determines whether the geo-location of the vehicle 105 is within the region of interest (ROI) 108. In case the geo-location of the vehicle 105 is within the region of interest (ROI) 108, the process 400 continues in a block 430. Otherwise, the process 400 continues in the block 405.

In the block 430, the computer 150 determines whether the message is the first message receive from the vehicle 105 from within the region of interest (ROI) 108. In case that it is the first message from the vehicle 105 from within the region of interest (ROI) 108, the process continues in a block 435. Otherwise, the process 400 continues in a block 440.

In the block 435, the computer 150 opens a vehicle log to record messages received from the vehicle 105. The computer 150 stores the first message in the log. For each message, the computer 150 may store the data from the message, together with a timestamp indicating when the message was received. The process 400 continues in the block 405.

In the block 440, which follows the block 430 in case that the received message was a second or subsequent message from the vehicle 105 after entering the region of interest (ROI) 108, the computer 150 logs the data from the received message in the vehicle log together with a timestamp indicating when the message was received. The process 400 continues in a block 445.

In the block 445, the computer 150 determines, based on a comparison of data from the currently received message and most recently received previous message, whether communication between the infrastructure device 140 and the vehicle 105 was discontinuous. The computer 150 may determine that the communication was discontinuous based on a time between two consecutively received messages being greater than a threshold amount of time and/or based on a distance between the vehicle locations of two consecutively received communications being greater than a threshold distance. As described below, the threshold amount of time may be based on an expected time between two consecutively received communications and the threshold distance may be based on an expected distance between the vehicle locations for two consecutively received messages.

For example, vehicles 105 may be programmed to transmit messages periodically, with a typical cycle period P. As an example, the typical cycle period P may be 100 milliseconds, corresponding to a 10 Hertz message transmission rate. A possible variance of the message period, due to equipment variations, latency in receiving transmissions, etc. may be +/−10%. An expected amount of time between two consecutively received transmissions may be, in this case, 100 milliseconds+/−10 milliseconds. That is, the cycle period P will be in a range from 90 milliseconds to 110 milliseconds with $P_{max}$, a maximum expected time between two consecutively received transmissions, being 110 milliseconds.

In one example, based on the transmission timing parameters above, the computer 150 may be programmed to determine that a communications discontinuity 305 has occurred when an amount of time $t_{int}$ between two consecutively received messages from a same vehicle 105 is greater than the maximum expected time $P_{max}$ of 110 milliseconds. As another example, to allow for the potential of missed messages, the computer 150 may be programmed to determine that a communications discontinuity 305 has occurred when the amount of time between two consecutively received messages is greater than (n) ($P_{max}$) where n is an integer number greater than or equal to 1. In the case that n is set to 2, the computer 150 would determine a communications discontinuity 305 to have occurred when an amount of time $t_{int}$ between two consecutively received messages from the same vehicle 105 is greater than (2) (110 milliseconds)=220 milliseconds.

Additionally or alternatively, the computer 150 may be programmed to determine that communications discontinuity 305 has occurred when a distance between vehicle locations of two consecutively received messages is greater than a threshold distance. The computer 150 may determine the threshold distance based on the vehicle velocity and an expected amount of time between two consecutive messages. The computer 150 may determine the vehicle velocity based on data in a message received from the vehicle 105.

For example, data in a message received from the vehicle 105 may indicate that the vehicle 105 was travelling with a velocity vi at the time of the message. As described above, an amount of time between two consecutive messages may be the cycle period P. The computer 150 may use the velocity $v_1$ of the vehicle 105 indicated by the data in the first of the two consecutive messages for calculating the threshold distance between the two consecutive messages.

To account for variations in the velocity vi during the cycle period following the first message, an amount of potential increase, for example, 10%, may be used to determine a maximum average velocity $v_{avemax}$ during the cycle period P. The maximum average velocity $v_{avemax}$ can then be calculated as:

$$v_{avemax} = (v_1)(1.1) \quad \text{Eq. 1}$$

Using the message timing parameters from above, $P_{max}=110$ milliseconds. An expected maximum distance $d_{max}$ between the vehicle location for two consecutively received messages can then be calculated according to equation 2 to be:

$$d_{max} = (v_{avemax})(P_{max}) \quad \text{Eq. 2}$$

In the example, the threshold distance be set to equal the expected maximum distance $d_{max}$.

Based on vehicle location data from two consecutively received messages, the computer 150 can further calculate an actual distance travelled $d_{trvl}$ by the vehicle 105 between the two messages. For example, on an x, y coordinate plane as shown in FIG. 3, a vehicle location for the first message of two consecutively received messages may be $x_i$, $y_i$ and a vehicle position for the second message of two consecutively received messages may be $x_{i+1}$, $y_{i+1}$. The distance travelled $d_{trvl}$ may then be calculated as:

$$d_{trvl} = \sqrt{(x_i - x_{i+1})^2 + (y_i - y_{i+1})^2} \quad \text{Eq. 3}$$

In a case that the actual distance traveled $d_{trvl}$ is greater than the threshold distance $d_{max}$, the computer 150 may determine that communication between the vehicle 105 and the infrastructure device 140 was discontinuous. The computer 150 may also apply other conditions for determining that communications were discontinuous. For example, the condition for determining a discontinuous communication may be that:

$$d_{trvl} > m \, d_{max} \quad \text{Eq. 4}$$

where m is an integer number greater than or equal to 1. To allow for one missed message without triggering a discontinuous communication detection, for example, m may be set to two.

In yet another example, the computer 150 may identify a communications discontinuity 305 when both an amount of time $t_{int}$ between two consecutively received messages is greater than a maximum expected time $P_{max}$ and a distance travelled between by the vehicle 105 between two consecutively received messages $d_{trvl}$ is greater than the maximum expected travel distance $d_{max}$.

In case that the computer 150 determines that a communications discontinuity 305 has occurred, the process 400 continues in a block 455. Otherwise, the process 400 continues in the block 405.

In the block 455, the computer 150 determines and stores the discontinuity edge locations 201e for the communications discontinuity 305. The discontinuity edge locations may be determined, for example, based on the vehicle location $x_i$, $y_i$ at the time of receipt of the first message and $x_{i+1}$, $y_{i+1}$ at the time of receipt of the second message. The process 400 continues in a block 460.

In the block 460, the computer 150 determines whether a trigger event has occurred to end the process 400. As non-limiting examples, a trigger event could be user input to end the process 400 or the expiration of an amount of time since the process 400 was initiated. For example, a user (operator) may choose to discontinue the process 400 during maintenance, or to assign/select a new region of interest (ROI) 108. As another example, the computer 150 could be programmed to collect discontinuity edges locations 201e for a predetermined amount of time, such as one minute or one hour. The computer 150 may determine that the predetermined amount of time has passed.

In the case that the computer 150 determines that a trigger event to end the process 400 has occurred, the process 400 ends. Otherwise, the process 400 continues in the block 405.

Figure 5:
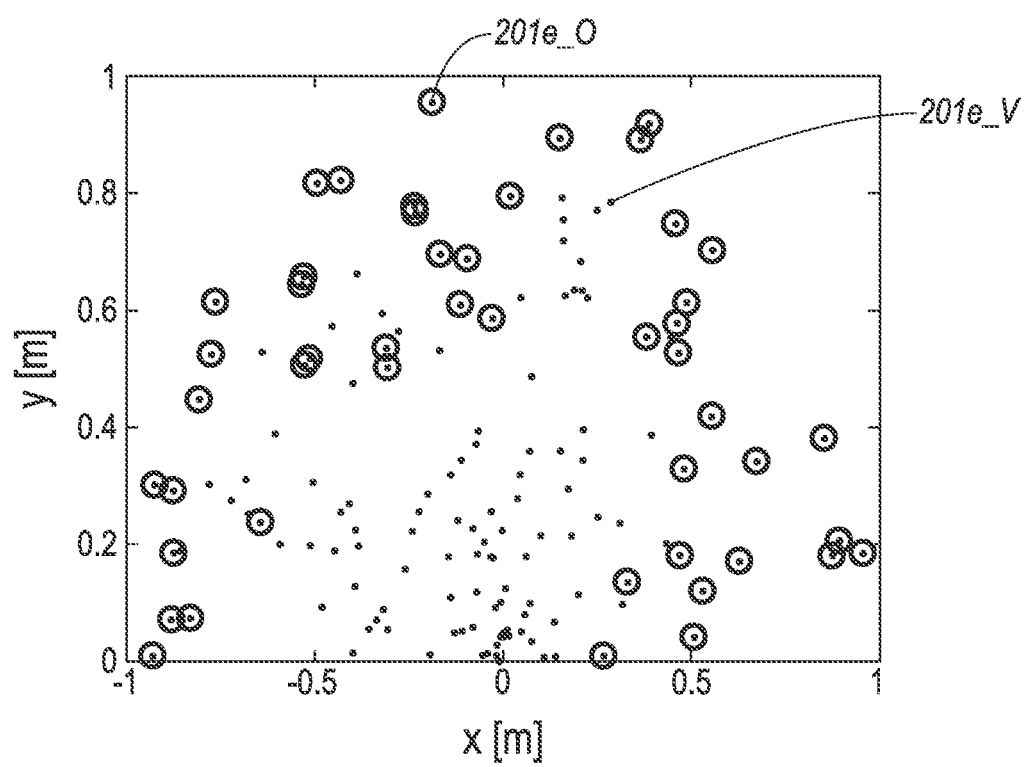
FIG. 5 is a diagram illustrating an example sample of discontinuity edge locations including identification of outlier discontinuity edge locations.

FIG. 5 is a diagram illustrating an example sample of discontinuity edge locations including valid discontinuity edge locations 201e_V and outlier discontinuity edge locations 201e_O. Valid discontinuity edge locations 201e_V are shown as dots without circles around them and outlier discontinuity edge locations 201e_O are shown as dots with circles around them. For ease of reading, only one discontinuity edge location 201e_V and one discontinuity edge location 201e_O are labelled.

As described below in reference to the process 700, the computer 150, after receiving a set of discontinuity edge locations 201e, for example from the process 400, sorts the discontinuity edge locations 201e into valid discontinuity edge locations 201e_V and outlier discontinuity edge locations 201e_O.

Figure 6:
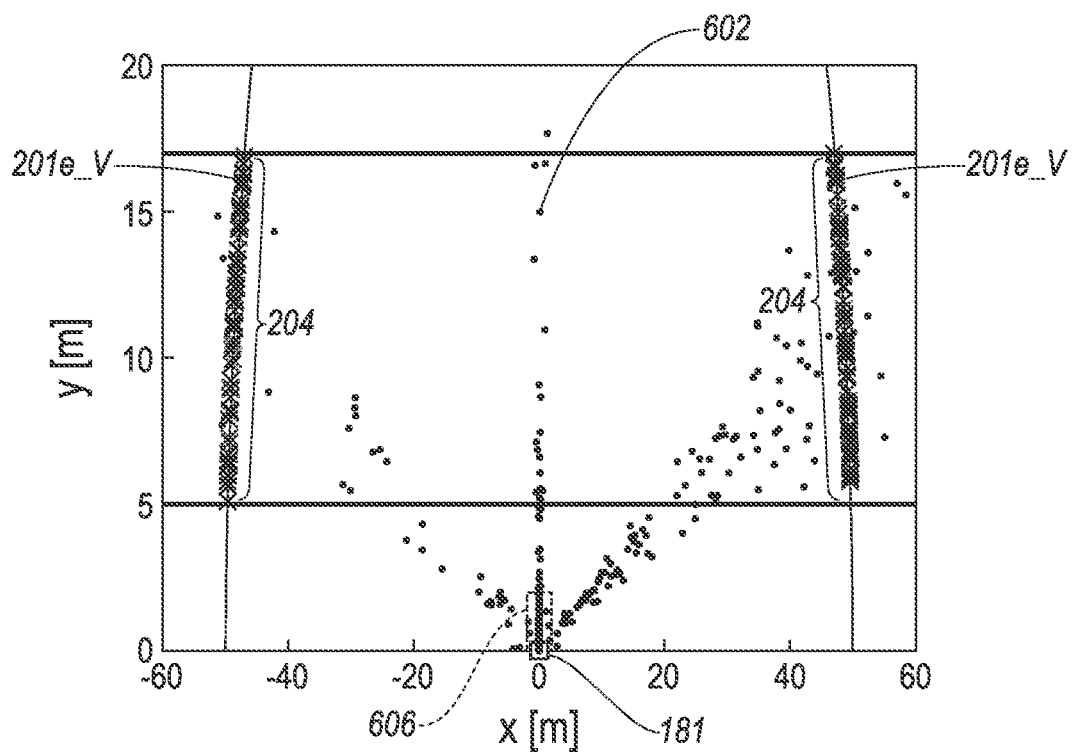
FIG. 6 is a diagram illustrating an example plurality of candidate interference node locations generated from respective sets of discontinuity edge locations.

FIG. 6 is a diagram illustrating locations of an example plurality of candidate interference node locations 602 generated from respective subsets of valid discontinuity edge locations 201e_V after discarding the outlier discontinuity edge locations 201e_O from a set of data points. FIG. 6 also illustrates an estimated location 606 of an interference node 180 based on the plurality of candidate interference node locations 602. As described below, the estimated location 606 of the interference node 180 may be a window within the region of interest (ROI) 108 including a highest number of candidate interference node locations 602 relative to other windows of a same size at other locations within the region of interest (ROI) 108.

As described below in reference to the process 700, the computer 150 calculates the plurality of candidate interference node locations 602 based on the respective sets of valid discontinuity edge locations 201e_V. The computer 150 then estimates the location 606 of the interference node 180 based on the plurality of candidate interference node locations 602.

Figure 7:
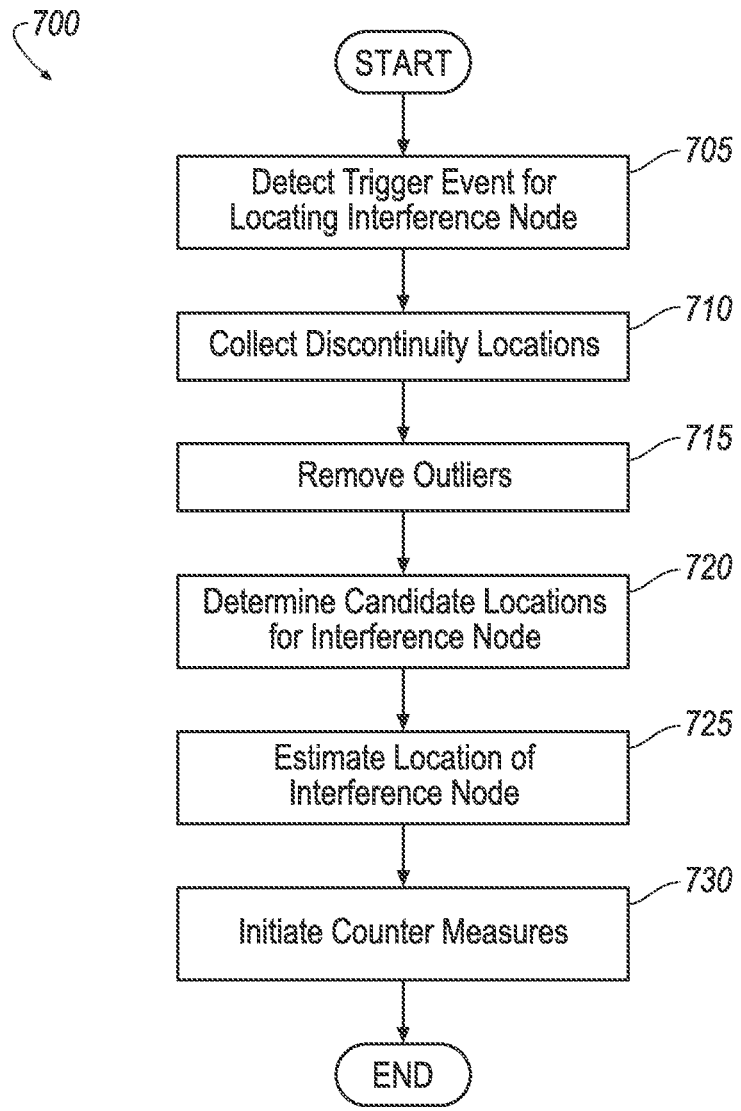
FIG. 7 is a flow diagram of an example process for estimating an interference node location based on identified discontinuity edge locations.

FIG. 7 is a flow diagram of an example process 700 for estimating an interference node location based on set of discontinuity edge locations 201e_O, 201e_V. The process 700 begins in a block 705.

In the block 705, the computer 150 in the infrastructure device 140 detects a trigger event to estimate a location of an interference node 180. As non-limiting examples, a trigger event could be user input requesting the computer 150 to begin the process 700, the expiration of an amount of time since a last execution of the process 700, and/or an indication that the process 400 has completed a collection period for collecting the set of discontinuity edge locations 201e_O, 201e_V. For example, the process 400 may be programmed to collect communications discontinuity data for a predetermined amount of time such as one minute, or one hour. Upon completion of the predetermined amount of time, the process 400 may set a digital flag or otherwise provide notice that data is available for analysis via the process 700.

Upon detecting a trigger event to estimate the location of the interference node 180, the process 700 continues in a block 710.

In the block 710, the computer 150 collects a set of data including a plurality of discontinuity edge locations 201e (including valid discontinuity edge locations 201e_V and outlier discontinuity edge locations 201e_O) for a region of interest (ROI) 108. Collecting this data may include, for example, accessing a set of data collected via the process 400. The process 700 then continues in a block 715.

In the block 715, the computer 150 may remove outlier discontinuity edge locations 201e_O from the set of discontinuity edge locations 201e_O, 201e_V. Outlier discontinuity edge locations 201e_O in this context means discontinuity edge locations 201e_O that may be caused by normal packet drops during V2X communications. Outlier discontinuity edge locations 201e_O may be determined statistically. For example, outlier discontinuity edge locations 201e_O may be defined as discontinuity edge locations 201e_O that have fewer than a threshold number of other (either outlier or valid) discontinuity edge locations 201e_O, 201e_V within a predetermined distance. The predetermined distance may be a fixed distance such as two meters. The threshold number of other discontinuity edge locations 201e_O, 201e_V may be based on a total sample size. For example, the threshold number may be calculated as a percentage (for example, 10%) of the total number discontinuity edge locations 201e_O, 201e_V in the set of discontinuity edge locations 201e_O, 201e_V.

Other algorithms may additionally or alternatively be used. For example, a mean location along one or both of an x axis and a y axis may be determined, and discontinuity edge locations 201e_O rejected that vary more than a threshold amount from the mean. The threshold amount may be a fixed amount such as one meter, or a statistical quantity such as one standard deviation. Because there may be a cluster of discontinuity edge locations 201e_O, 201e_V near each transition lines 204 of the interference zone 181, the computer 150 may identify two clusters of discontinuity edge locations 201e_O, 201e_V and identify a separate mean value for each of the two clusters. The computer 150 may then determine outlier discontinuity edge locations 201e_O for each of the two clusters based on a deviation from the mean within the clusters.

Upon identifying outlier discontinuity edge locations 201e_O, the computer 150 generates what can be referred to as a clean set of discontinuity edge locations 201e_V by removing the outlier discontinuity edge locations 201e_O from the set of discontinuity edge locations 201e_O, 201e_V. The process 700 continues in a block 720.

In the block 720, the computer 150 executes an algorithm for estimating a location 606 of an interference node 180 based on the clean set of discontinuity edge locations 201e_V. As an example, the computer 150 may identify a plurality of subsets of three randomly selected discontinuity edge locations 201e. For each subset, the computer 150 may generate a respective candidate interference node location 602. The candidate interference node may be calculated to be a center of a circle whose circumference passes through the subset of the three randomly selected discontinuity edge locations 201e_V.

In an example, the three discontinuity edge locations 201e_V in a subset can be $\{(x_1, y_1), (x_2, y_2), (x_3, y_3)\}$. A center $(x_0, y_0)$ of the circle whose circumference passes through these three discontinuity locations 201e_V can be calculated based on the equations 5-8. below:

$$u = \frac{x_1^2 - x_2^2 + y_1^2 - y_2^2}{2} \qquad \text{Eq. 5}$$

$$v = \frac{x_2^2 - x_3^2 + y_2^2 - y_3^2}{2} \qquad \text{Eq. 6}$$

$$x_0 = \frac{u(y_2 - y_3) - v(y_1 - y_2)}{(x_1 - x_2)(y_2 - y_3) - (x_2 - x_3)(y_1 - y_2)} \qquad \text{Eq. 7}$$

$$y_0 = \frac{u(x_2 - x_3) - v(x_1 - x_2)}{(y_1 - y_2)(x_2 - x_3) - (y_2 - y_3)(x_1 - x_2)} \qquad \text{Eq. 8}$$

The computer 150 applies the above equations 5-8 on a number m of subsets to generate a set of m candidate interference node locations.

To narrow down the location of the interference node 180, the computer 150 can then evaluate windows of a fixed size, for example 2-by-2 meters to determine an amount of candidate interference nodes 602 within each window. For example, the computer 150 can move the sliding window to different locations within the region of interest (ROI) 108 and determine a score for each window location. The score for each window location can be calculated, for example, as a portion of candidate interference node locations 602 within the window location over the total number of candidate interference node locations 602. The computer 150 can then estimate, for example, that the location of the interference node 180 is within the window location with the highest score. In the example data of FIG. 6, the dashed-dotted window 606 has a score of 0.615 and indicates an estimated location of the interference node 180. The process 700 continues in a block 730.

In the block 730, the computer 150 can initiate counter measures to restore vehicle-to-vehicle (V2V) and vehicle-to-infrastructure (V2I) communications in the interference zone 181. For example, the computer 150 may report the location of the interference node 180 to a team that may travel to the location and eliminate the interference by removing or turning off the interference node 180. In some cases, the computer 150 may direct sensors 155 on or associated with the infrastructure device 140, for example cameras 155, to collect images of the interference node 180 to facilitate identifying the interference node by the team dispatched to eliminate the interference. As another example, the computer 150 may report the location of the interference node 180 to vehicles 105 entering the region of interest. The vehicles 105 may be able to adjust operations to be less dependent on vehicle-to-vehicle (V2V) communications. For example, the vehicles 105 may slow down. The vehicle 105 may further be able to switch communications to a different communications channel that is not subject to interference from the interference node 180. Still further, the vehicle 105 may be able to change a programmed route to a route farther from the interference node 180 and thereby avoid the interference zone 181. Still further, in cases that communications disruptions are detected, but some discontinuity edge locations 201e cannot be determined, the computer 150 may adjust the region of interest 108 to locate discontinuity edge locations 201e of future vehicles 105 travelling along the road 106.

Upon the computer 150 initiating counter measures, the process 700 ends.

The processes 400 and 700 are described above as being executed by a computer 150 in the infrastructure device 140. This is not intended to be limiting. A portion or all of the processes 400 and 700 can be executed by other computing devices such as the server 170.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
    receive, at an infrastructure device from each of a plurality of vehicles within a region, a respective plurality of messages;
    identify, for each of the plurality of vehicles, a respective communications discontinuity during which an expected message fails to be received from the respective vehicle;
    determine, for each communications discontinuity, discontinuity edge locations at each of a beginning of the communications discontinuity and an end of the communications discontinuity;
    identify, from the discontinuity edge locations, outlier discontinuity edge locations based on a number of other discontinuity edge locations within a predetermined distance less than a threshold number of other discontinuity edge locations;
    remove the outlier discontinuity edge locations from the discontinuity edge locations;
    select a plurality of subsets of discontinuity edge locations from the discontinuity edge locations, each of the plurality of subsets including at least three selected discontinuity edge locations; and
    determine an interference node location that includes a node causing interference within the discontinuity edge locations.

2. The system of claim 1, wherein the plurality of messages from each of the plurality of vehicles are received by the infrastructure device.

3. The system of claim 2, wherein the plurality of vehicles within the region are within range for vehicle-to-infrastructure communications with the infrastructure device.

4. The system of claim 1, wherein identifying each communications discontinuity is based on an amount of time between two consecutively received messages from the respective vehicle greater than a threshold amount of time.

5. The system of claim 1, wherein identifying each communications discontinuity is based on a travel distance between two consecutively received messages from the respective vehicle greater than a threshold distance.

6. The system of claim 5, wherein the threshold distance between the two consecutively received messages is based on data from one of the messages received from the respective vehicle specifying a velocity of the vehicle.

7. The system of claim 1, wherein determining the discontinuity edge location at the beginning of each communications discontinuity is based on a location of the respective vehicle at a time of transmitting a last message received prior to the communications discontinuity.

8. The system of claim 1, wherein determining the discontinuity edge location at the end of each communications discontinuity is based on a location of the respective vehicle at a time of transmitting the first message received after the communications discontinuity.

9. The system of claim 1, wherein the processor is further programmed to:
    output the interference node location to at least one second computing device.

10. The system of claim 1, wherein the processor is further programmed to:
    identify, for each of the subsets of discontinuity edge locations, a respective location of a center of a circle whose circumference passes through the respective three randomly selected discontinuity edge locations; wherein determining the interference node location is based on the locations of the centers of the circles.

11. The system of claim 1, wherein the processor is further programmed to:
    upon receiving a first message of the respective plurality of messages for each of the vehicles in the region, open a log to record messages from the respective vehicle.

12. A method comprising:
    receiving, at an infrastructure device from each of a plurality of vehicles within a region, a respective plurality of messages;
    identifying, for each of the plurality of vehicles, a respective communications discontinuity during which an expected message fails to be received from the respective vehicle;
    determining, for each communications discontinuity, discontinuity edge locations at each of a beginning of the communications discontinuity and an end of the communications discontinuity;
    identifying, from the discontinuity edge locations, outlier discontinuity edge locations based on a number of other discontinuity edge locations within a predetermined distance less than a threshold number of other discontinuity edge locations;
    removing the outlier discontinuity edge locations from the discontinuity edge locations;
    selecting a plurality of subsets of discontinuity edge locations from the discontinuity edge locations, each of the plurality of subsets including at least three selected discontinuity edge locations; and
    determining an interference node location that includes a node causing interference within the discontinuity edge locations.

13. The method of claim 12, wherein:
    the plurality of messages from each of the plurality of vehicles are received by the infrastructure device; and
    the plurality of vehicles within the region are within range for vehicle-to-infrastructure communications with the infrastructure device.

14. The method of claim 12, wherein identifying each communications discontinuity is based on at least one of (1) an amount of time between two consecutively received messages from the respective vehicle greater than a threshold amount of time and (2) a travel distance between two consecutively received messages from the respective vehicle greater than a threshold distance.

15. The method of claim 12, wherein determining the discontinuity edge location at the beginning of each communications discontinuity is based on a location of the respective vehicle at a time of transmitting a last message received prior to the communications discontinuity and determining the discontinuity edge location at the end of each communications discontinuity is based on a location of the respective vehicle at a time of transmitting the first message received after the communications discontinuity.

16. The method of claim 12, further comprising:
outputting the interference node location to at least one second computing device.

17. The method of claim 12, further comprising:
identifying, for each of the subsets of discontinuity edge locations, a respective location of a center of a circle whose circumference passes through the respective three randomly selected discontinuity edge locations; wherein determining the interference node location is based on the locations of the centers of the circles.

18. The method of claim 12, further comprising:
upon receiving a first message of the respective plurality of messages for each of the vehicles in the region, opening a log to record messages from the respective vehicle.

19. A system comprising a computer including a processor and a memory, the memory including instructions such that the processor is programmed to:
receive, from each of a plurality of vehicles within a region, a respective plurality of messages;
identify, for each of the plurality of vehicles, a respective communications discontinuity during which an expected message fails to be received from the respective vehicle;
determine, for each communications discontinuity, discontinuity edge locations at each of a beginning of the communications discontinuity and an end of the communications discontinuity;
identify, from the discontinuity edge locations, outlier discontinuity edge locations based on a number of other discontinuity edge locations within a predetermined distance less than a threshold number of other discontinuity edge locations;
remove the outlier discontinuity edge locations from the discontinuity edge locations;
determine an interference node location that includes a node causing interference within the discontinuity edge locations; and
output the interference node location to at least one second computing device.

20. The system of claim 19, wherein the processor is further programmed to select a plurality of subsets of discontinuity edge locations from the discontinuity edge locations, each of the plurality of subsets including at least three selected discontinuity edge locations.

* * * * *